United States Patent [19]

Hansen

[11] 4,075,860
[45] Feb. 28, 1978

[54] MOBILE SHIP LOADING AND UNLOADING FACILITY

[75] Inventor: John H. Hansen, Mount Sinai, N.Y.

[73] Assignee: Delong Corporation, New York, N.Y.

[21] Appl. No.: 667,014

[22] Filed: Mar. 15, 1976

[51] Int. Cl.² .................. E02B 17/00; B63B 35/40
[52] U.S. Cl. .................................... 61/87; 61/48;
    61/91; 61/96; 61/97; 114/259; 114/260
[58] Field of Search .............. 61/87, 96, 97, 93, 90,
    61/86, 87, 48, 91; 114/43.5 VC, .5 D, 260;
    214/12, 14

[56] References Cited

U.S. PATENT DOCUMENTS

| | | | |
|---|---|---|---|
| 1,565,875 | 12/1925 | Von Haase | 214/12 |
| 2,997,852 | 8/1961 | Suderow | 61/93 |
| 3,273,527 | 9/1966 | Goldman | 114/260 |
| 3,511,507 | 5/1970 | Suter | 61/93 X |
| 3,802,209 | 4/1974 | Weaver | 114/.5 D |
| 3,823,681 | 7/1974 | Cushing et al. | 114/260 |
| 3,934,530 | 1/1976 | Kossa et al. | 114/43.5 VC |
| 3,939,790 | 2/1976 | Varges et al. | 114/43.5 VC |
| 3,948,056 | 4/1976 | Sumner | 61/96 |

*Primary Examiner*—Jacob Shapiro
*Attorney, Agent, or Firm*—Cushman, Darby & Cushman

[57] ABSTRACT

A method of establishing a ship loading or unloading pier facility comprises providing a buoyant self-propelled vessel having removable jack-up legs and a well carrying a plurality of buoyant jack-up platforms, propelling the vessel with the legs stored on deck to an off-shore site adjacent a shore line, floating the platforms out of the vessel through an opening in the hull thereof, jacking-up the vessel to render it stationary, and arranging the platforms together with connecting tressels to form a roadway between the vessel and to shore. The vessel carries a crane which is used to remove and install the jack-up legs and to transport cargo between a cargo ship moored to the vessel and the roadway.

10 Claims, 5 Drawing Figures

MOBILE SHIP LOADING AND UNLOADING FACILITY

This invention relates to a method and apparatus for constructing a ship loading or unloading pier facility using buoyant jack-up platforms and a special jack-up vessel which transports the platforms to a pier site and which itself forms part of the pier facility.

BACKGROUND AND SUMMARY OF THE INVENTION

It is known to provide buoyant off-shore platforms, such as well-drilling platforms, docks and barges, which can be floated to a desired position and then supported from the submerged bottom in an above-water position by means of vertical tubular legs or caissons. A typical platform has four or more legs each carried by a jacking device which is capable of effecting relative vertical movement between the leg and the platform. After the floating platform has arrived at the desired location the jacking devices lower the legs into contact with the submerged bottom. Once the legs become embedded in the bottom and cease to move downwardly continued operation of the jacking devices causes the platform to rise out of the water relative to the legs. Jacking is stopped when the platform reaches an elevation at which it is unaffected by wave action. The platform can be moved to another site by lowering it down into the water, raising the legs away from the submerged bottom and towing or propelling the platform through the water. Platforms of this type are more fully described in a number of United States patents of which U.S. Pat. No. 2,775,869 (Pointer) is exemplary.

The use of such floating jack-up platforms to erect a pier for ship loading and unloading has been suggested in the past. The principal advantage of the technique is that the pier can be erected at a remote site in a much shorter time than would be required if conventional construction methods are used. The savings in erection time result primarily from the facts that the platforms are prefabricated at a shipyard where all construction facilities are available and that essentially the platforms need only be jacked-up once they arrive at the remote site. The technique does include a delay, however, in that the marine transport time is considerable. The usual method of transport is by towing, and the weight, shape and design of the platforms limits the towing speed to substantially less than the speed of, for example, a cargo ship. Currently platforms of this type can be towed successfully about 100 miles per day. Self-propelling the platforms would not significantly improve the speed.

There is therefore a need to provide a system for transporting and erecting a pier facility in a shorter time than is presently available. The shorter time period is of strategic advantage in providing equipment, food and supplies during military and naval operations and is also of advantage in setting up relief operations to supply food and supplies in the event of natural disasters and in erecting piers in polar areas where navigation is restricted to a short period each year. Generally such systems are intended for erecting a temporary facility which can be disassembled and moved to another site or to a storage area.

According to the invention there is provided a method of establishing a ship loading or unloading facility which comprises: providing a buoyant self-propelled vessel capable of substantial speed and having removable jack-up legs adapted to be stored in generally horizontal positions on the vessel and to be inserted vertically in jacking devices carried by the vessel, the vessel having a space carrying a plurality of buoyant jack-up platforms or barges and having a load lifting crane; propelling the vessel to an off-shore location adjacent a shore where it is desired to load or unload a cargo ship; releasing the buoyant platforms from the vessel; jacking-up the vessel to render it stationary; and, jacking-up the platforms in an arrangement between the vessel and the shore to provide access for road vehicles, whereby a cargo ship may be moored to the jacked-up vessel so that cargo may be transported by the crane from the ship to an adjacent barge or in the reverse direction. This method, using a vessel of conventional speed, is capable of moving all of the essential parts of a loading and unloading facility to a site at a speed substantially in excess of that possible by towing. A typical vessel speed of 20 knots is equivalent to about 500 miles per day as compared to a typical towing rate of 100 miles per day.

According to another feature of the invention the jack-up platforms or barges are loaded into and unloaded from the jack-up vessel by floating them into or from a well provided in the vessel. This can be accomplished by having the well open through the stern of the vessel and by providing the vessel with ballast tanks capable of lowering the stern to place the well in communication with the sea. The forward end of the well need not become flooded to a depth equal to the draft of the buoyant platforms. Once the forward end of a platform has entered the opening in the stern of the vessel the platform can be winched forward along rollers provided on the bottom of the well. Alternatively the well may be flooded to a depth sufficient to permit loading or unloading of the platforms solely by floating. The opening between the well and the sea may be permanently open or provided with closure means.

According to another feature of this invention there is provided a special self-elevating vessel for use in carrying out the method of the invention. The vessel comprises: an elongated buoyant hull which is self-propelled, a plurality of jack-up legs removably carried in jacking devices mounted on the vessel, the vessel having a deck providing space for storing the legs in a generally horizontal position; a well in the hull for receiving and discharging a plurality of buoyant platforms through an opening which can be placed in communication with the surrounding water, and a crane mounted on the vessel for movement longitudinally of the vessel, the crane being operable to remove and replace the jack-up legs with respect to their jacking devices and being operable to transport cargo between a ship located on one side of the vessel and a pier structure on the other side of the vessel.

DETAILED DESCRIPTION OF EXEMPLARY EMBODIMENT

The invention will be further understood from the following more detailed description taken with the drawings in which.

Figure 1:
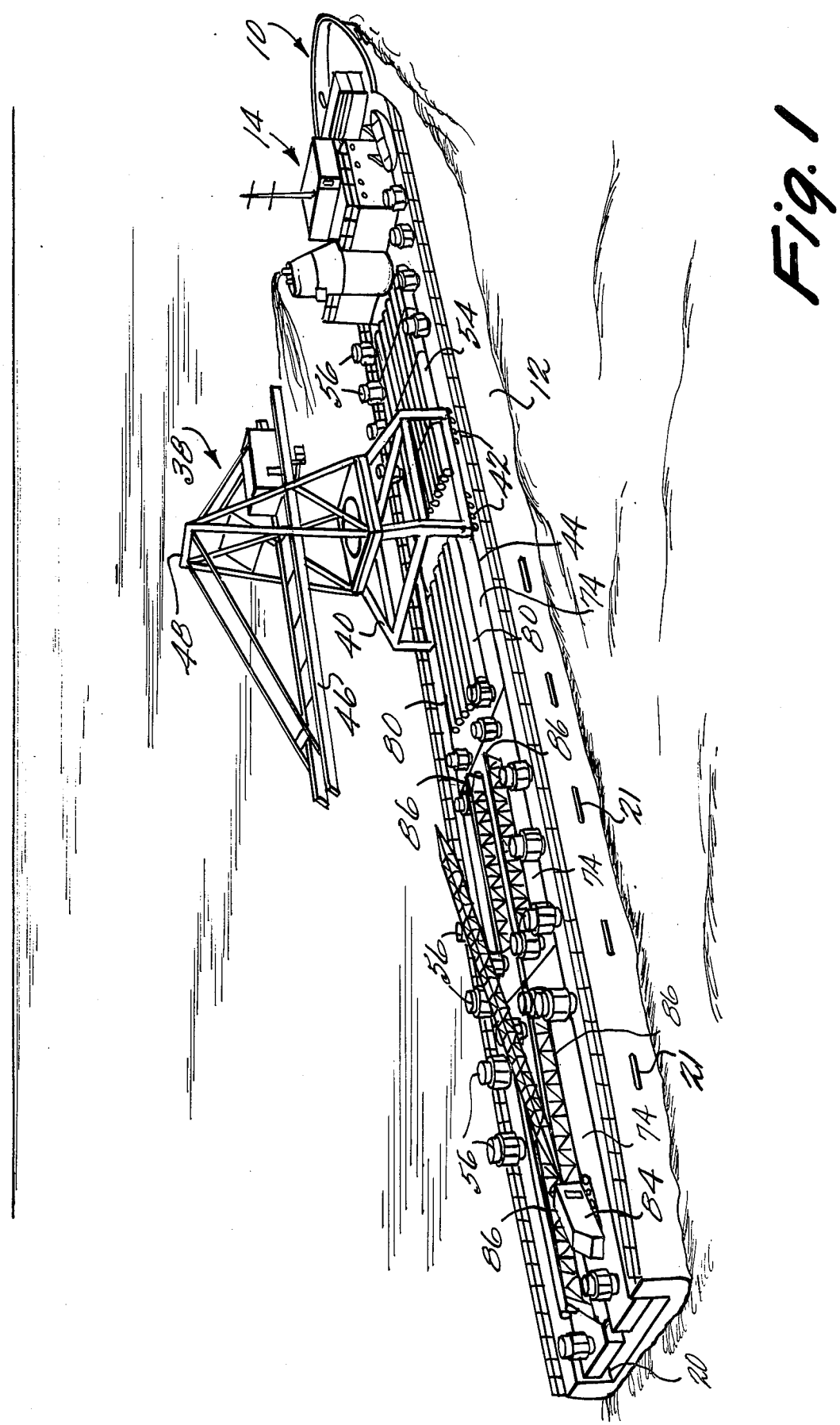
FIG. 1 is a schematic perspective view of a self-elevating vessel embodying the principles of the present invention.
Figure 2:
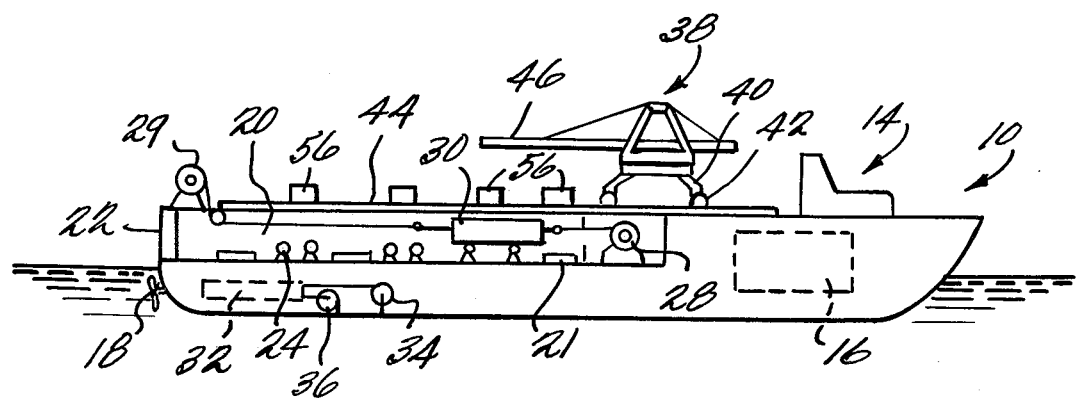
FIG. 2 is a schematic vertical longitudinal sectional view, on a reduced scale, of the vessel of FIG. 1.

Referring to FIGS. 1 and 2 there is shown a vessel which includes an elongated hull 12 having forwardly located quarters 14 for the crew and for the operation of the vessel. An engine room 16 and related equipment is located below deck. Propulsion of the vessel 10 is by means of twin engine-driven screws one of which is shown at 18. In the after half of the vessel 10 is a well 20 which can be placed in communication with the surrounding water through an opening 22 in the stern. The side walls of the well 20 are provided with holes 21 for permitting sea water to drain out of the well 20 when the vessel is under way. A plurality of rollers 24 are mounted on the bottom wall 26 of the well for rotation about horizontal axes extending transversely of the vessel 10. Winches 28 and 30 are mounted forward and aft of the well 20 for aiding in loading and unloading three buoyant jack-up platforms 30.

One or more ballast tanks 32 are disposed below or alongside the well 20 trimming the aft portion of the vessel. Means for filling the ballast tank 32 with sea water and for emptying the tank are illustrated in the form of pumps 34 and 36.

A traversing gantry crane 38 is supported on four legs 40 which span essentially the width of the vessel 10. The lower ends of the legs 40 carry rollers 42 which engage one of two parallel tracks 44 supported on the deck. A boom 46 having a length sufficient to extend laterally beyond either side of the vessel 10 is mounted in a supporting assembly 48 which is rotatable 360° relative to the leg assembly about a vertical axis.

A plurality of jack-up assemblies 50, sixteen in the illustrated embodiment are carried by the vessel 10. Each assembly 50 includes an annular jacking mechanism 52 and a removable tubular leg 54 or caisson. The assemblies 50 may be of known construction as described in detail in U.S. Pat. Nos. 2,775,869, 3,422,505 or 3,844,002.

Figure 3:
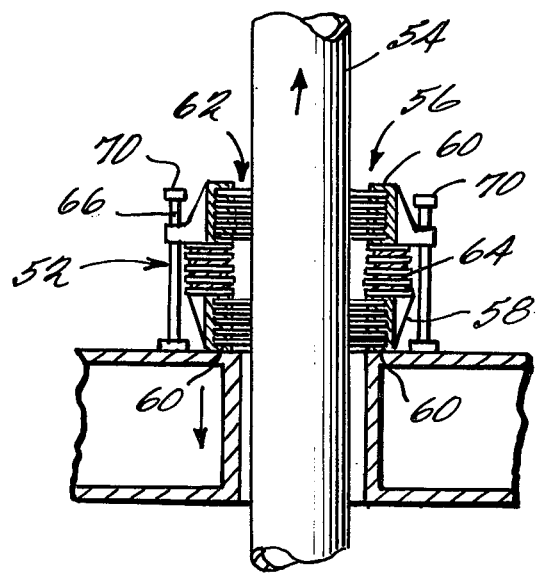
FIG. 3 is a schematic vertical sectional view of one of the jacking mechanisms of FIG. 1.

Each jacking mechanism 52 as shown schematically in FIG. 3 includes vertically spaced upper and lower gripper sections 56 and 58, each comprising a caisson-surrounding rigid collar 60 or sleeve having a plurality of inner circumferential annular channels which face inwardly toward the leg 54. Within each cannel is an annular gripper assembly 62, illustrated schematically which is adapted for positively yet releasably gripping the leg 54 when the assembly 62 is supplied with high pressure fluid through a suitable connection (not shown). Between the upper and lower sections 56 and 58 is a leg surrounding, inflatable, bellows-like section 64 capable of exerting a powerful but controllable force to move the upper and lower sections 56 and 58 apart, while several pressure-cylinder retractors (not shown) are spaced about and connected to both the upper and lower sections to draw them toward each other when the bellows is exhausted.

Abutment means are provided on the deck to limit both downward movement of the lower jack section 58 relative to the vessel 10 and upward movement of the upper jack section 56 relative to the vessel 10. In the embodiment described the lower section 58 is engageable against the deck, while the upper section 56 is fastened to the vessel 10 by a plurality of circumferentially-arranged tie rods 66. The upper section 56 is slidable on the rods 68, but upward movement is limited by heads 70 on the latter engageable by the upper section 56.

Each jack 52 can be operated to impart step-by-step vertical linear relative movement in either direction between its leg 54 and the vessel 10. For example, in order to move the leg 54 upwardly relative to the vessel 10, as shown by the upwardly pointing arrow in FIG. 3, the lower section 58 engages the deck of the vessel 10, the gripper assemblies 62 in the upper jack section 56 are engaged with the leg 54, and the bellows assembly 64 is inflated. When the jack 52 is operated to exert a downward force on the leg 54 to move the latter downwardly, as indicated by the downwardly-pointing arrow, it will be seen that the upper jack section 56 is engaged against the heads 70 of the tie rods 68 while the gripper assemblies 62 in the lower jack section 58 grip the leg 54, so that by inflating the bellows assembly 64 the leg 54 will be forced downwardly. Obviously, the vessel 10 can be moved up and down along the legs 54 by operating the jacks 52 simultaneously after the lower ends of the legs 54 have been embedded in a submerged bottom.

As shown in FIG. 1 the well 20 of the vessel 10 carries three buoyant jack-up platforms 30. Each of these platforms 30 may be of conventional construction as shown in U.S. Pat. No. 2,775,869 and as such each platform 30 includes a buoyant hull 74 having a horizontal rectangular upper deck 76 and a jack-up assembly 78 at each corner. Each jack-up assembly includes a removable leg 80 and a jacking mechanism 82 which may be the same as the legs 54 and the mechanisms 56.

Two of the platforms 30 are provided with conventional self-propelled twin-tracked crawler cranes 84. In the illustrated embodiment as shown in FIG. 1 there are provided four prefabricated trestles 86 which are stored on the decks 76 of the platforms 30.

It will be noted that in FIG. 1 the jack-up legs 54 and 80 have been removed from their respective jacking devices 56 and 82 by means of the crane 38 and have been stored in horizontal positions on the deck of the vessel 10. The ballast tank 32 has been emptied to dispose the well 20 above the surface of the water and as shown in this view the vessel 10 is proceeding through the water toward a site where it is desired to erect a pier assembly.

Figure 4:
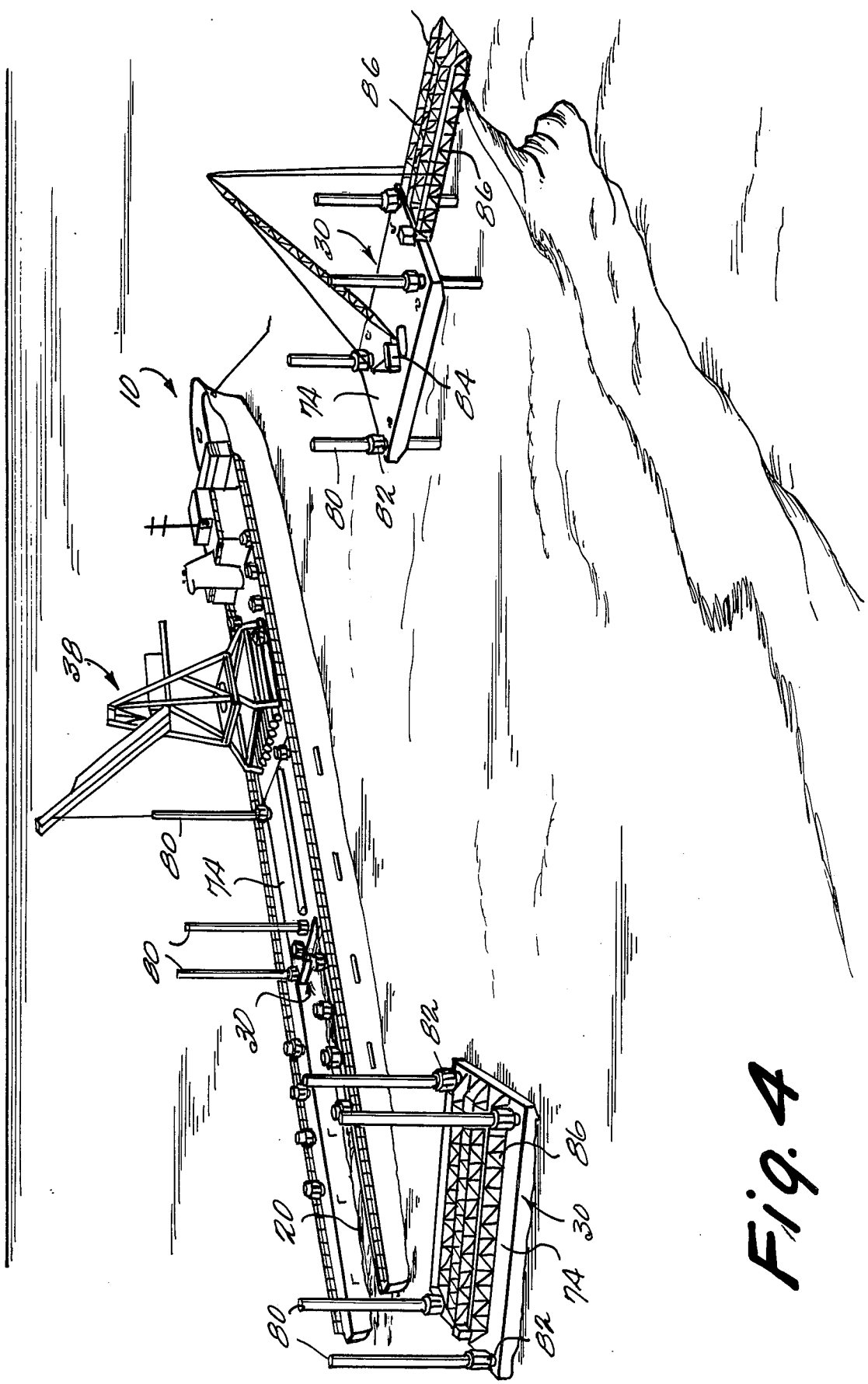
FIG. 4 is a schematic perspective view of the vessel illustrating an early stage in the construction of a pier facility; and, FIG. 5 is a schematic perspective view of the vessel illustrating a completed pier facility.

Referring to FIG. 4, when the vessel 10 arrives at the desired site the platform jack-up legs 80 are laced by means of the crane 38 into their respective jacking mechanisms 82. Then water is admitted to the ballast tank 32 to trim the aft end of the vessel to a depth such that the after-most platform 30 can be floated out. This platform carries one of the crawler cranes 84 and two of the trestles 86 and it may be equipped with an outboard propulsion unit (not shown) so that it can self-propel itself to a position about one trestle length from the shore line. When in place it lowers its legs 80 into engagement with the submerged bottom and then jacks itself out of the water to an elevation at which it is free of wave action. The crawler crane 84 then places the two trestles 86 so as to span the distance between the platform 30 and the shore, and one end of each trestle 86 is secured to the platform 30.

Figure 5:
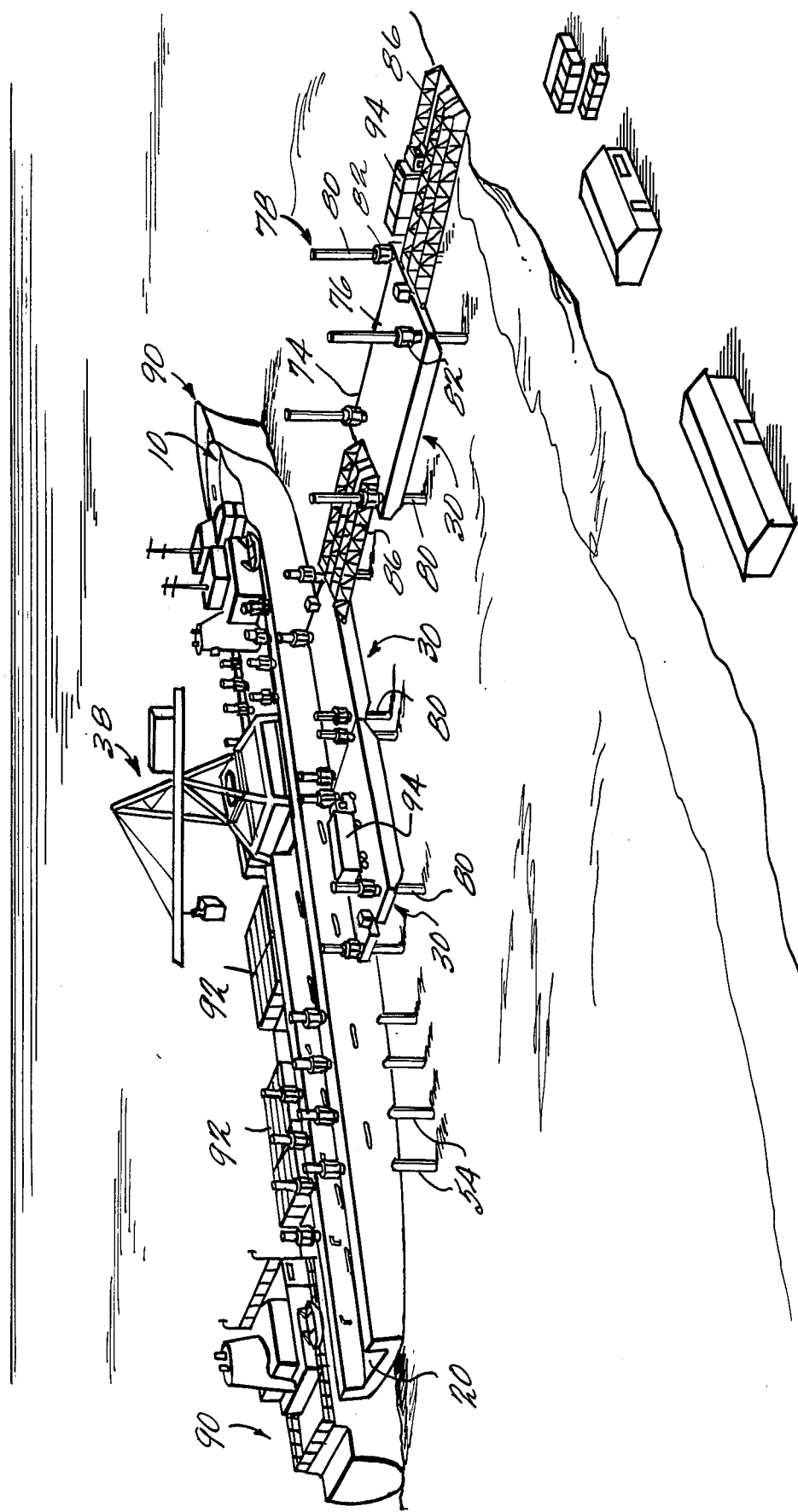

The other two platforms, also equipped with outboard propulsion units (not shown) and with their legs 80 in place, are then pulled aft by the winch 29, sliding along the rollers 24 unit buoyant, and floated through the opening 22. The second platform 30, which caries the other crawler crane 84 and the other two trestles 86, takes up a position one trestle length away from the first platform 30 and at a right angle to it (FIG. 5). The second platform 30 then jacks itself out of the water to the same elevation as the the first platform 30. The first crawler crane 84 then installs the two other trestles 86 to span the distance between the first and second platforms 30.

Then the third platform 30 in winched and floated out of the well 20 and floated to a position end-to-end with the second platform to form a two-platform island. The third platform then jacks itself to the same elevation as the first two. The crawler crane 84 on the first platform crawls over to the second platform with each track supported by a trestle. The cranes 84 take up unloading positions and fenders (not shown) are put out on either side of the two-platform island to receive lighters (not shown).

After the platforms 30 have been removed from the vessel 10 the crane 38 on the vessel 10 laces the vessel legs 54 into the jacking mechanisms 56 and the latter are operated to elevate the vessel 10 to an above water position in which it is unaffected by wave action. Preferably the axis of the vessel 10 is at right angels to the wave crests. Fenders (not shown) are put out port and starboard for a cargo ship 90 and lighters (not shown). After the cargo ship 90 has been moored and made fast to the jacked-up vessel 10 the gantry crane 38 is swung around across the cargo ship 90. The crane 38 removes cargo 92 from the ship 90, swings 180° and deposits the cargo either on the two adjacent platforms 30 or on to any of several trucks 94 which then carry the cargo to its destination. The crane 38 is moved along the tracks 44 as necessary, and the ship 90 may be repositioned with the help of winches (not shown) if the length of crane travel is insufficient to reach all the cargo 92.

When it is desired to remove the installation the procedure described above is reversed. In loading the platforms 30 into the well 20 the winch 28 is employed rather than the winch 29.

What is claimed is:

1. A method of establishing a ship loading or unloading pier facility comprising: providing a buoyant vessel having a plurality of jack-up legs insertable in and removable from vertically extending jack holes in the vessel, the vessel having storage space carrying at least one buoyant jack-up platform; floating the vessel with the legs stored in horizontal positions on the deck to an offshore site adjacent a shore line; removing at least one buoyant platform from the vessel and arranging the platform in a floating mode in the water adjacent the vessel; inserting the legs into the jack holes and jacking-up the vessel by means of said legs to render the vessel stationary; floating the platform into a position between the vessel and the shore line and jacking-up the platform; and forming a roadway, which includes the jacked-up platform, between the shore and the vessel.

2. A method as in claim 1 wherein the buoyant platform is removed from the vessel by floating the platform through an opening in the vessel which is in communication with the surrounding water.

3. A method as in claim 1 wherein the vessel is provided with self-propelling means and is self-propelling to the off-shore site.

4. A method as in claim 1 wherein the vessel carries a crane and wherein the legs are hoisted by the crane to a vertical position in order to insert them into the jack holes.

5. A method as in claim 1 wherein the jack-up platform has jack-up legs insertable in and removable from jack holes in the platform and wherein the platform legs are removed from their jack holes and stored in horizontal positions on the deck of the vessel while the vessel is being floated to the off-shore site.

6. A method of establishing a ship loading or unloaded pier facility comprising: providing a buoyant self-propelled vessel having removable jack-up legs and storage space carrying at least one buoyant jack-up platform, propelling the vessel with the legs stored on deck to an off-shore site adjacent a shore line, removing the platform from the vessel by floating the platform through an opening in the vessel which is in communication with the surrounding water; jacking up the vessel by means of the legs to render the vessel stationary, and arranging the platform in a jacked-up position together with at least one connecting tressel to form a roadway between the vessel and the shore.

7. A method as in claim 6 wherein the vessel carries a crane and wherein the step of jacking-up the vessel includes lifting the legs from their horizontal stored positions and lowering them in vertical positions into engagement with jacking devices supported on the vessel.

8. A vessel for use in constructing a ship loading or unloading pier facility comprising: an elongated buoyant self-propelled hull provided with a storage well which has a bottom wall and side walls extending longitudinally of the hull, said well being capable of being placed in direct communication with the surrounding water through an opening in the stern of the vessel to enable at least one buoyant jack-up platform to pass into and out of the storage well; a plurality of longitudinally spaced-apart jack-up assemblies disposed inboard of the vessel and between the storage well and each side of the vessel and additional jack-up assemblies disposed forwardly of the well, said jack-up assemblies being operable to support the vessel in an above-water position from the submerged bottom, each assembly including an annular jacking device supported on the vessel and a jack-up leg insertable into the respective jacking device; said vessel having a storage deck area located forward of said storage well, said area having a longitudinal dimension which is greater than its transverse dimension and which is at least as great as the length of the jack-up legs; and a crane supported by the vessel for moving the legs between a horizontal longitudinal position on said storage deck area and a vertical position within their respective jacking devices, said crane having legs positioned to span the storage well and the storage deck area, said legs having lower ends movably mounted on rails extending longitudinally of the vessel, said rails extending along the storage deck area and along the storage well at a location.

9. A vessel as in claim 8 including at least one ballast tank for adjusting the level of the stern of the vessel so as to locate the well at an appropriate level to pass water through the opening between the well and the surrounding water, and rollers mounted on the bottom wall of the well for rotation about horizontal axes extending transversely of the vessel, hauling means for hauling a jack-up platform between a floating position in the stern portion of the storage well and a stored position on the rollers in the forward part of the well.

10. A vessel as in claim 8 wherein the crane has a boom operable to transport cargo between a cargo ship located along one side of the vessel and a pier platform located on the other side of the vessel.

* * * * *